(12) United States Patent
Wong

(10) Patent No.: US 11,975,434 B2
(45) Date of Patent: May 7, 2024

(54) CONTROL ASSEMBLY FOR USE WITH AN ELECTRIC POWER TOOL

(71) Applicants: DEFOND ELECTECH CO., LTD, Guangdong (CN); DEFOND COMPONENTS LIMITED, Chai Wan (HK)

(72) Inventor: Wai Man Wong, Chai Wan (HK)

(73) Assignees: DEFOND ELECTECH CO., LTD, Guangdong (CN); DEFOND COMPONENTS LIMITED, Chai Wan (HK)

(*) Notice: Subject to any disclaimer, the term of this patent is extended or adjusted under 35 U.S.C. 154(b) by 964 days.

(21) Appl. No.: 16/932,564

(22) Filed: Jul. 17, 2020

(65) Prior Publication Data
US 2021/0016427 A1   Jan. 21, 2021

(30) Foreign Application Priority Data
Jul. 18, 2019   (HK) .................................. 19126999.2

(51) Int. Cl.
| B25D 16/00 | (2006.01) |
| B23B 45/02 | (2006.01) |
| B25F 5/00 | (2006.01) |
| H01H 3/20 | (2006.01) |
| H01H 9/06 | (2006.01) |

(52) U.S. Cl.
CPC ............ *B25D 16/006* (2013.01); *B23B 45/02* (2013.01); *B25F 5/001* (2013.01); *H01H 9/06* (2013.01); *B25D 2216/0084* (2013.01); *B25D 2250/255* (2013.01); *H01H 3/20* (2013.01)

(58) Field of Classification Search
CPC .......... B25D 16/006; B25D 2216/0084; B25D 2250/255; B23B 45/02; B25F 5/001; H01H 9/06; H01H 3/20; H01H 3/50; G05G 5/06; G05G 5/065
USPC .............................................................. 173/2
See application file for complete search history.

(56) References Cited

U.S. PATENT DOCUMENTS

| 3,271,536 A * | 9/1966 | Schink ..................... H01H 9/12 |
| | | 200/260 |
| 3,996,440 A * | 12/1976 | Niconienko ......... H01H 19/115 |
| | | 200/570 |
| 4,078,449 A * | 3/1978 | Kelly ....................... G05G 5/06 |
| | | 74/526 |
| 4,383,147 A * | 5/1983 | Raab .................. B60H 1/00785 |
| | | 200/5 E |
| 4,517,422 A * | 5/1985 | Black, III ............ H01H 13/568 |
| | | 200/5 E |

(Continued)

FOREIGN PATENT DOCUMENTS

| CN | 101414523 A | 4/2009 |
| CN | 104282456 A | 1/2015 |

(Continued)

OTHER PUBLICATIONS

Hong Kong Patent Application Search Report dated Aug. 3, 2019 for HK 19126999.2.

*Primary Examiner* — Dariush Seif
(74) *Attorney, Agent, or Firm* — Bryan D. Zerhusen, Esq.; Nicholas R. Herrel, Esq.; CANTOR COLBURN LLP

(57) ABSTRACT

A control assembly for use with an electrical device to control operation of the electrical device in a plurality of operational modes.

20 Claims, 5 Drawing Sheets

(56) References Cited

U.S. PATENT DOCUMENTS

| | | | | |
|---|---|---|---|---|
| 4,567,950 | A * | 2/1986 | Fushiya | B25D 16/006 173/104 |
| 4,621,174 | A * | 11/1986 | Kondo | B60H 1/0065 200/61.86 |
| 4,837,413 | A * | 6/1989 | Schwab | H01H 19/585 200/11 R |
| 5,134,898 | A * | 8/1992 | Anderson | G05G 1/08 74/527 |
| 5,213,136 | A * | 5/1993 | Thorp | B25F 5/001 137/625.68 |
| 5,589,671 | A * | 12/1996 | Hackbarth | H01H 19/115 200/11 R |
| 5,594,220 | A * | 1/1997 | Hackbarth | H01H 19/63 200/266 |
| 5,819,597 | A * | 10/1998 | Sato | H01H 19/63 116/315 |
| 6,220,114 | B1 * | 4/2001 | Ray | G05G 5/06 74/531 |
| 6,354,170 | B1 * | 3/2002 | Beugelsdyk | G05G 5/06 251/231 |
| 6,424,245 | B1 * | 7/2002 | Rector | H01H 3/50 335/220 |
| 6,759,933 | B2 * | 7/2004 | Fallak | G05G 9/00 335/207 |
| 9,372,497 | B2 * | 6/2016 | Wall | G05G 5/06 |
| 9,651,108 | B2 * | 5/2017 | Lamminger | F16D 71/04 |
| 11,623,335 | B2 * | 4/2023 | Wong | H02P 6/08 318/400.38 |
| 11,694,862 | B2 * | 7/2023 | Wong | H01H 13/14 200/43.18 |
| 2002/0014343 | A1 * | 2/2002 | Funfer | B25D 16/006 173/48 |
| 2008/0197004 | A1 * | 8/2008 | Ishigaki | B60K 35/10 200/336 |
| 2009/0095614 | A1 * | 4/2009 | Miura | G05G 1/08 200/6 A |
| 2011/0075328 | A1 * | 3/2011 | Shedletsky | H01H 15/06 361/679.01 |
| 2015/0158168 | A1 * | 6/2015 | Lauterwald | B25D 16/006 173/48 |
| 2015/0367490 | A1 * | 12/2015 | Satou | B25D 16/006 173/48 |
| 2016/0083078 | A1 * | 3/2016 | Crandall-Seibert | G05G 1/04 74/523 |
| 2016/0085259 | A1 * | 3/2016 | Crandall-Seibert | G05G 25/00 74/526 |
| 2016/0320793 | A1 * | 11/2016 | Organ | G05G 5/06 |
| 2017/0106517 | A1 * | 4/2017 | Machida | B25D 16/00 |
| 2017/0313407 | A1 * | 11/2017 | Crandall-Seibert | B64C 13/0425 |
| 2018/0308653 | A1 * | 10/2018 | Shea | H01H 9/10 |
| 2019/0190240 | A1 * | 6/2019 | Kroushl | H02B 1/14 |
| 2021/0016427 | A1 * | 1/2021 | Wong | B25F 5/00 |
| 2021/0069888 | A1 * | 3/2021 | Hairul | H01H 9/06 |

FOREIGN PATENT DOCUMENTS

| | | |
|---|---|---|
| CN | 109360751 A | 2/2019 |
| CN | 209118974 U | 7/2019 |
| DE | 102005001560 A1 | 7/2006 |
| EP | 2837989 A1 | 2/2015 |

* cited by examiner

CONTROL ASSEMBLY FOR USE WITH AN ELECTRIC POWER TOOL

CROSS-REFERENCE TO RELATED APPLICATION

This application claims the benefit of Hong Kong Patent Application serial number 19126999.2, filed 18 Jul. 2019, entitled "A Control Assembly for Use with an Electric Power Tool", which is hereby incorporated by reference in its entirely for all purposes.

TECHNICAL FIELD

The present invention relates to electrical devices such as power tools having control assemblies such as may be used for controlling forward and reverse operational directions of the device.

BACKGROUND

Electrical devices such as power tools and the like will often include a forward-reverse control assembly for use in varying operation of an electric motor of the electrical device between forward and reverse modes of operation. Typically, the control assembly will include a hand-operable mechanism (e.g. a rotatable lever or handle mechanism) that is rotatable through a range of positions to effect modes of operation including forward mode of operation and reverse mode of operation. Also, typically, the control assembly will include a detent assembly that designed to provide controlled movement of the control assembly as the hand-operable mechanism is rotatably operated by the user. One problem with such existing devices is that the force required to be applied to the control lever as it is progressively rotated through its range of operational positions becomes increasingly more difficult due to the inherent design of the detent mechanism.

SUMMARY

The present invention seeks to alleviate at least one of the above-described problem.

The present invention may involve several broad forms. Embodiments of the present invention may include one or any combination of the different broad forms herein described.

In one broad form, the present invention provides a control assembly for use with an electrical device to control operation of the electrical device in a plurality of operational modes, the control assembly including:
 a. a rotary member rotatably movable about a rotational axis between at least one of a first rotational position, a second rotational position, and, a third rotational position, said second rotational position being an intermediate position between the first and third rotational positions;
 b. a sliding carriage member operably-connected with the rotary member, said sliding carriage member being configured for linear sliding movement in to first, second and third sliding positions along a sliding axis in response to the rotary member between arranged in the first, second and third rotational positions, respectively;
 c. a switch module operably-connected with the sliding carriage member, said switch module being configured for switching operation of the electrical device between a first operational mode, a second operational mode, and a third operational mode in response to the sliding carriage member being arranged in the first, second and third sliding positions, respectively;
 d. a detent assembly operably-connected with the sliding carriage member to control movement of the sliding carriage member along the sliding axis, said detent assembly including a force compensation mechanism and whereby responsive to operation of the force compensation mechanism of the detent assembly, an amount of force required to effect movement of the rotary member between its first and second rotational positions, and, an amount of force required to effect movement of the rotary member between its second and third rotational positions is able to be maintained substantially uniform.

Preferably, the electrical device may include an electric motor, and wherein, the first operational mode includes operation of the electric motor in a first direction and the second operational mode includes operation of the electric motor in a reverse direction to that of the first direction.

Preferably, the rotational axis may be substantially perpendicular to the sliding axis.

Preferably, the detent assembly may include a spring-loaded protrusion configured for releasably engaging with a first, second and third detent recess incrementally as the sliding carriage member slidably moves along the sliding axis in to the first, second and third sliding positions, respectively.

Preferably, the spring-loaded protrusion may be disposed on the sliding carriage member.

Preferably, the force compensation mechanism may include at least one of the first, second and third detent recesses being configured to vary in terms of at least one of a shape, size, depth, width, curvature, and surface texture whereby the amount of force required to effect movement of the rotary member between its first and second rotational positions, and, the amount of force required to effect movement of the rotary member between its second and third rotational positions is able to be maintained substantially uniform. Alternately and/or additionally, the force compensation mechanism may include a shape, size, length, width, curvature, surface texture, or other characteristic or property of the structure or of the material being configured so that its interaction with the detent recesses will differ to compensate for detent force discrepancies.

Preferably, the rotary member may include a user-operable control lever that may be operably-connected with the sliding carriage member whereby rotational movement of the control lever about the rotational axis is translated into linear sliding movement of the sliding carriage.

Preferably, the present invention may include a handle member operably-connected to the rotary member, said handle member being user-operable so as to effect rotational movement the rotary member about the rotational axis.

Preferably, the rotary member and the handle member may be rotatable about the rotational axis.

Preferably, the first operational mode may include the electric motor being driven in a relatively forward direction, the second operational position may include an open circuit between the electric motor and the power supply, and the third operational position may include the electric motor being driven in a relatively reverse direction.

Preferably, the electrical device may include at least one of an electric power tool and an electric gardening tool.

BRIEF DESCRIPTION OF THE DRAWINGS

The present invention will become more fully understood from the following detailed description of a preferred but non-limiting embodiments thereof, described in connection with the accompanying drawings, wherein.

DETAILED DESCRIPTION

Preferred embodiments of the present invention will now be described with reference to FIGS. 1 to 8 in the form of a control assembly for use in selectably-controlling the direction of operation of an electric power tool such as an electric drill having an electric motor. However, the present invention may be suitably adapted for use with other types of electrical devices such as electric gardening tools, without departing from the inventive concept. The electric power tool includes a housing (10) mounted near a handle of the tool within which is housed a main switch assembly that is operable between ON and OFF states by a trigger assembly. Power from a power supply is selectably connected and disconnected from the motor of the electric power tool in response to the main switch assembly being switched between ON and OFF states by a trigger assembly. The control assembly is at least partially housed within the same housing (10) but in a separate compartment of the housing away from the main switching assembly. Details of the main electrical switching assembly as well as other component system of the electric power tool (e.g. the signaling module, control module and power module) will not be described in any detail herein as such would be well understood by persons skilled in the art and are not directly relevant to an understanding of the specific operation of embodiments of the present invention.

Figure 1:
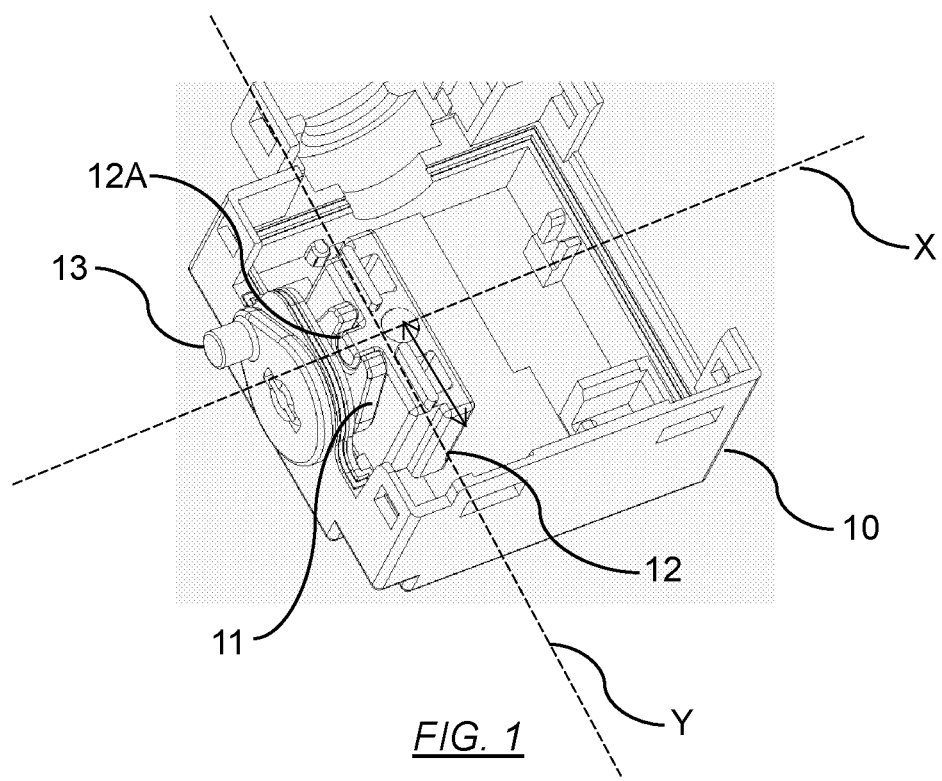
FIG. 1 shows an internal-view of a switch housing of a first embodiment of the present invention in which a handle member plate is used.
Figure 2:
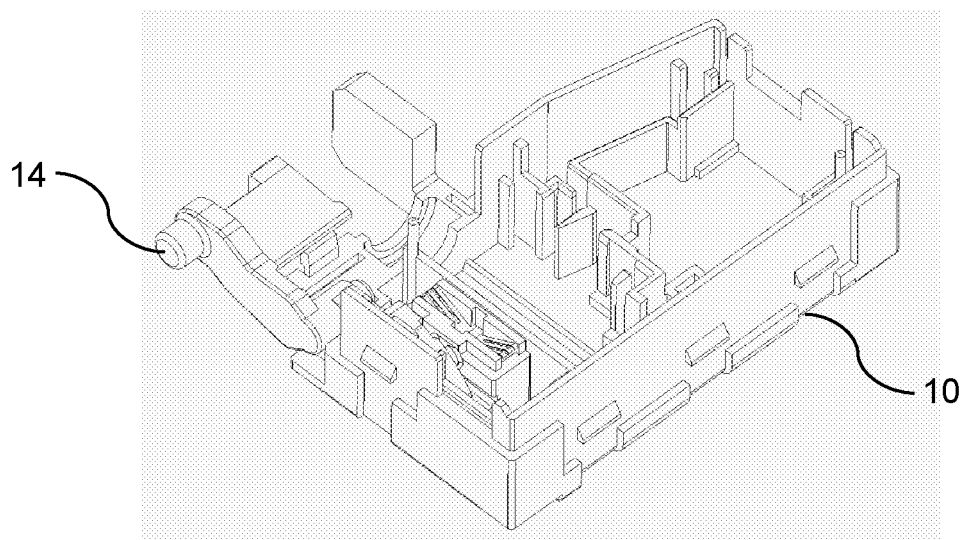
FIG. 2 shows an internal-view of a switch housing of a first embodiment of the present invention in which a control lever is used.

Referring to FIG. 2, an embodiment of the present invention is shown comprising a rotary member (11) that is rotatably movable about a rotational axis (X) between at least one of a first rotational position, a second rotational position, and, a third rotational position. In this embodiment, the second rotational position is an intermediate position between the first and third rotational positions.

A sliding carriage member (12) is operably-connected with the rotary member (11) and is configured for linear sliding movement incrementally in to first, second and third sliding positions along a sliding axis (Y) in response to the rotary member (11) between arranged in the first, second and third rotational positions, respectively. In the present embodiment an arm (12A) extends from a wall of the sliding carriage member (12) towards the rotary member (11) perpendicularly to the sliding axis (Y). The arm (12A) is received within a slot disposed in the rotary member (11) such that as the rotary member (11) is rotated about its rotating axis amongst the first, second and third rotational positions, the rotary member (11) is configured to translate its rotational movement into sliding movement of the sliding carriage member (12) by virtue of the shaped configuration and engagement of the sliding carriage member arm (12A) within the rotary member slot. In this embodiment, a handle member plate (13) is also operably-connected with the rotary member (11) and rotatable about the same rotational axis (X) as the rotary member (11). The handle member plate (13) provides for an ergonomic user-operable handle to effect turning of the rotary member (11). The rotation of the handle member plate (13) may be configured at a different gearing ratio to that of the rotary member (11) so that for instance, a relatively smaller amount of rotational movement of the handle member plate (13) may result in a relatively greater amount of rotational movement of the rotary member (11). In certain embodiments, the rotary member (11) and the handle member plate (13) may be integrally formed together as a single piece. In alternate embodiments, the rotary member (11) may comprise a lever member (14) having a first end (14A) and a second end (14B) that are levered about a hinge (14C). The first end (14A) of the lever member (14) extends outwardly from the housing (10) and is configured for engagement by a user's hand whilst the second end (14B) is disposed within the housing (10) and includes a curved slot (14D) configured for receiving an arm (12A) extending rigidly from a wall of the sliding carriage (12) perpendicularly to the sliding axis (Y). As the lever is rotated about the hinge amongst forward, reverse and OFF operational positions, the interaction of the arm (12A) within the curved slot (14D) is varied so as to translate the rotary movement of the lever (14) into sliding movement of the sliding carriage member (12) amongst the first, second and third sliding positions along the sliding axis (Y), respectively. It should be appreciated that in certain embodiments, the sliding carriage arm (12A) and the slot (14D) disposed on the rotary member (11) may be reversed such that the arm (12A) may be disposed on the rotary member (11) whilst the slot may be disposed on the sliding carriage member (12). Yet alternatively, in certain embodiments, the rotary-to-linear movement translation need not necessarily be effected by way of an arm and slot engagement at all and may instead be effected by way of any other suitable rotary-to-linear movement translation mechanism.

Figure 3:
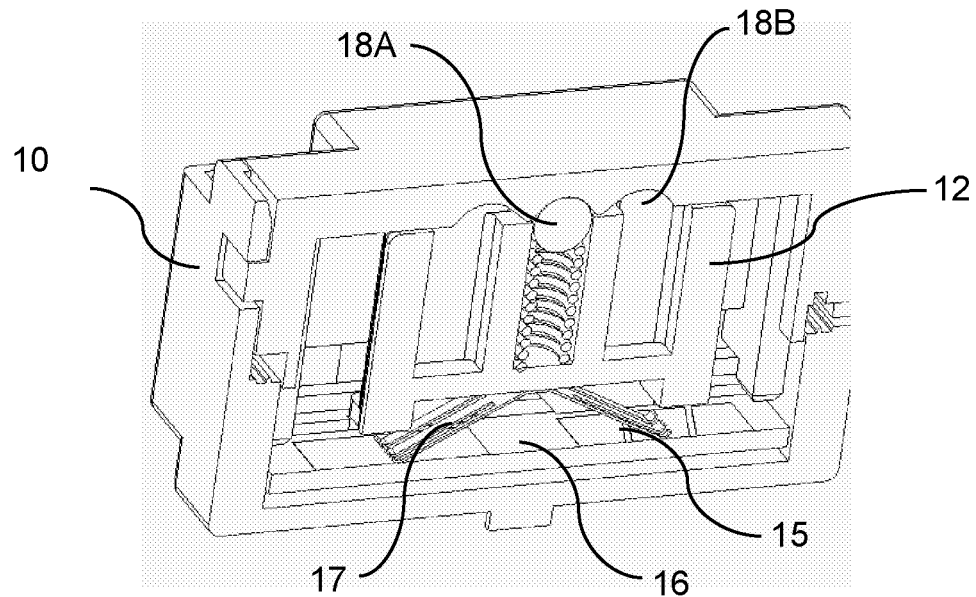
FIG. 3 shows an internal-view of a switch housing of the first embodiment of the present invention in which the sliding carriage member and detent mechanism are visible.
Figure 4:
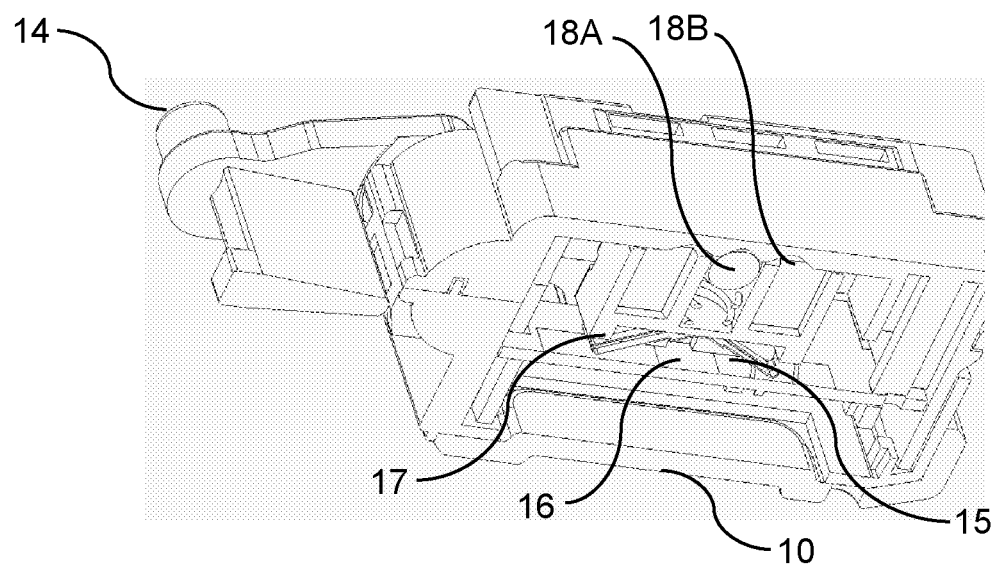
FIG. 4 shows an internal-view of a switch housing of the second embodiment of the present invention in which the sliding carriage member and detent mechanism are visible.
Figure 5:
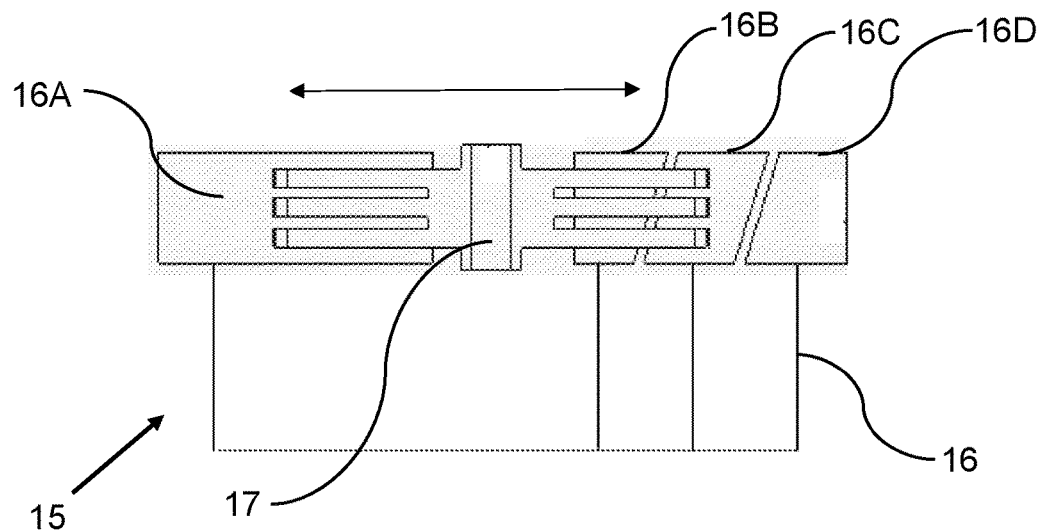
FIG. 5 shows a stand-alone representation of the switching module of the control assembly in accordance with the first and second embodiments that is operably-connected with the sliding carriage member in these embodiments.
Figure 6:
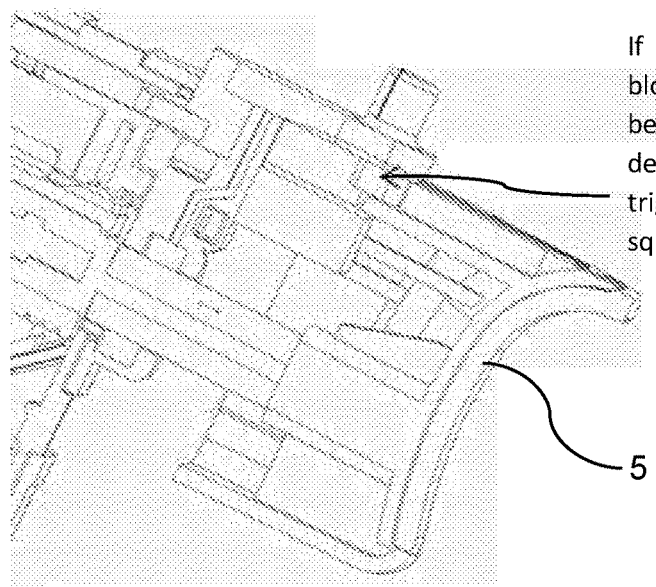
FIG. 6 shows another view of the first embodiment of the present invention.
Figure 7A:
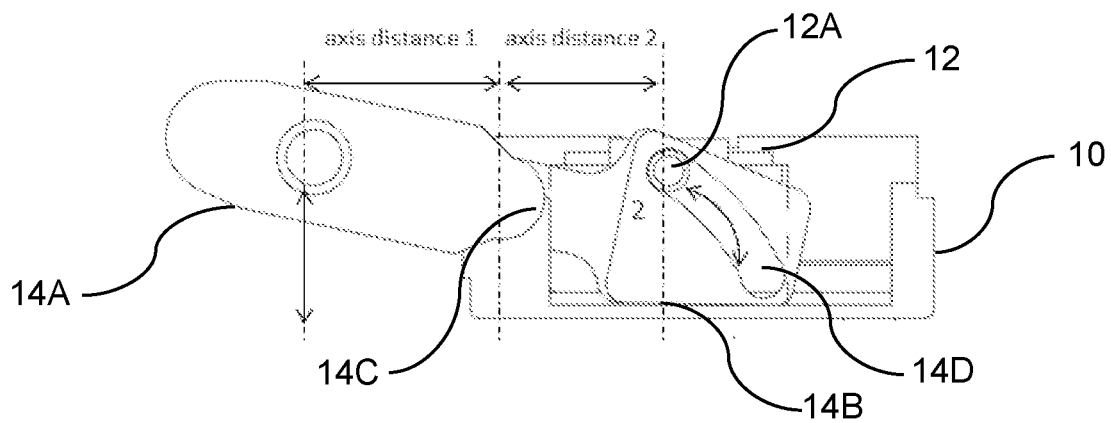
FIGS. 7A-7C shows a series of views of the second embodiment in operation whereby the lever is rotated through first, second and third rotational positions, and in response, the sliding carriage member is slidingly moved through sliding first, second and third sliding positions, respectively.
Figure 7B:
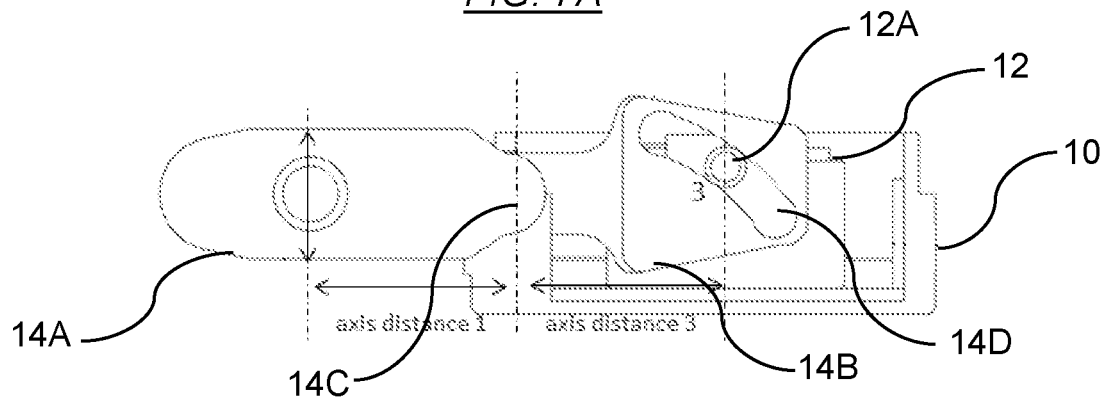
Figure 7C:
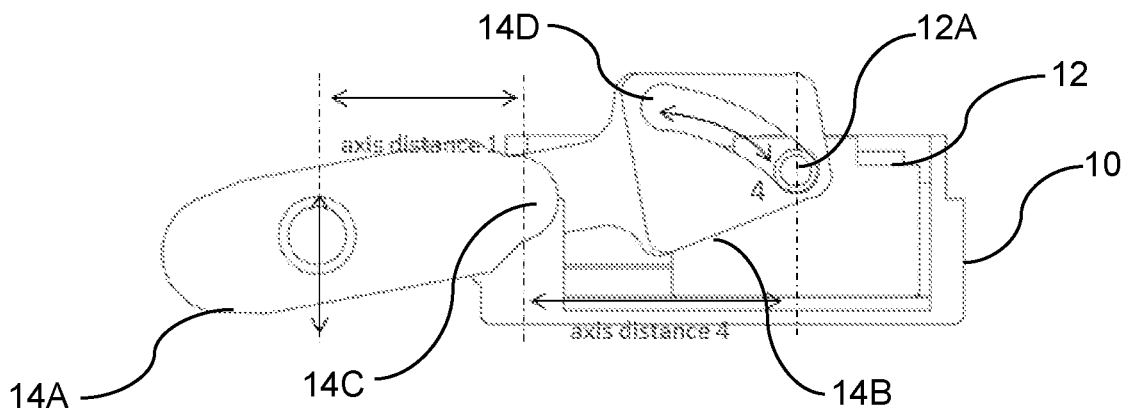

Referring particularly to FIGS. 3 to 5, a switch module (15) is shown operably-connected with the sliding carriage member (12) and is configured for switching the polarity of the electric terminals of the power supply that are applied to the electric motor depending upon the sliding position of the sliding carriage member. By way of example, in this embodiment, when the sliding carriage member (12) is arranged in the first sliding position the switch module (15) is configured to connect the electric terminals of the power supply to the electric motor with a suitable polarity so as to drive the electric motor in a forward (clockwise) mode of operation. When the sliding carriage member (12) is arranged in the second sliding position, the switch module (15) is configured to be open-circuited so as to electrically disconnect the electric terminals of the power supply from the electric motor—that is, an OFF operational mode. When the sliding carriage member (12) is arranged in the third sliding position the switch module (15) is configured to connect the electric terminals of the power supply to the electric motor with a suitable polarity to drive the electric motor in a reverse (anti-clockwise) mode of operation. By way of example in FIG. 5 it can be seen that the switching module (15) comprises four electrically separate electrical terminals—a common terminal (16A), a forward/clockwise signal terminal (16B), an "Normal Open" contact terminal (16C), and a revers/ant-clockwise signal terminal (16D) that are disposed on a printed circuit board (16) within the housing (10). A conductive wiper (17) is mounted on the sliding carriage member (12) and is slidable with the sliding carriage member so that (i) when the sliding carriage member (12) is arranged in the first sliding position, the conductive wiper (17) is configured to electrically connect the common terminal (16A) with the forward/clockwise terminal (16B) so as to effect forward signal polarity to the electric motor; (ii) when the sliding carriage member (12) is arranged in the second sliding position, the conductive wiper (17) is configured to electrically connect the common terminal (16A) with the Normally Open terminal (16C) whereby the switching module circuitry is electrically disconnected; and (iii) when the sliding carriage member (12) is arranged in the third sliding position, the conductive wiper (17) is configured to electrically connect the common terminal (16A) with the reverse/anti-clockwise terminal (16D) so as to effect reverse signal polarity to the electric motor. Certain conventional power tool forward/reverse levers only provide for two operational positions—that is, forward and reverse direction without any intermediate "Normally Open" position. In such conventional designs, in the event of a failure in the locking assembly which locks off operation (see example in FIG. 6) of the trigger (5) (for instance, due to mechanical/heat induced deformation of the components of the locking assembly) the electric power tool may be inadvertently switched on in either a forward or reverse direction thus putting the user at risk of injury. The inclusion of the "Normally Open" intermediate position of the forward/reverse control assembly in this embodiment seeks to alleviate this risk such that if there is a failure in the trigger locking assembly and the trigger is inadvertently actuated, the power tool will still not operate when the control assembly is arranged in the "Normally Opened" position. In alternate embodiments of the present invention, the polarity switching may be effected by any suitable means in response to the positioning of the sliding carriage member without being limited to the particular arrangement described herein.

Figure 8:
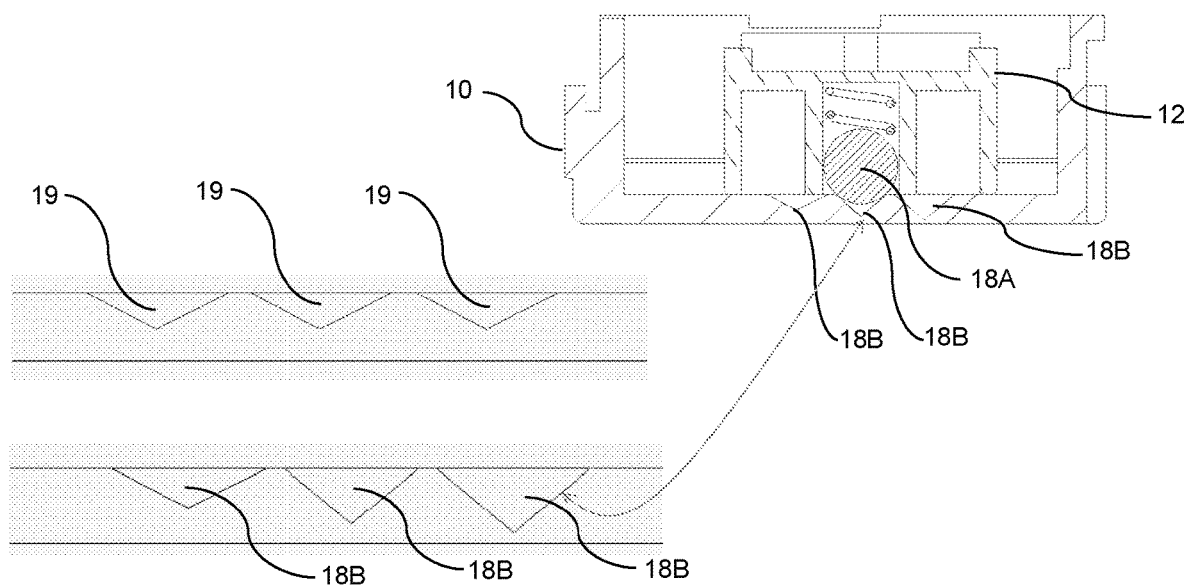
FIG. 8 depicts the detent slots of a conventional detent mechanism design (19) compared to those of an example modified detent recesses (18B) that provide force compensation in accordance with embodiments of the present invention.

Referring particularly to FIG. 8, a detent assembly is operably-connected with the sliding carriage member (12) and housing (10) to provide controlled movement of the sliding carriage member (12) along the sliding axis (Y). The detent assembly is disposed within the electrical switch housing (10) and includes a spring-loaded protrusion (18A) mounted on and protruding outwardly away from one side of the sliding carriage member (12) towards an inward facing wall of the housing. First, second and third detent recesses (18B) are integrally formed in the inward-facing wall of the housing (10) so that the spring-loaded protrusion (18A) is configured to releasably engage with the first, second and third detent recess (18B) incrementally as the sliding carriage member (12) slidably moves along the sliding axis (Y) in the first, second and third sliding positions, respectively.

The incremental engagement of the spring-loaded protrusion (18A) within the first, second and third detent recesses (18B) assists in controllably resisting the movement of the sliding carriage member (12) along the sliding axis (Y). In alternate embodiments of the present invention it may be contemplated that the detent recesses (18B) and the spring-loaded protrusion (18A) may be located in a reverse arrangement whereby the detent recesses are formed in the sliding carriage member and the spring-loaded protrusion is located in the housing wall. Further, in alternate embodiments, it may be contemplated that the spring-loaded protrusion may not necessarily be spring-loaded at all, and instead, the detent recesses may be formed from or include some resilient material instead to provide suitable springiness in lieu of the spring being removed from the design.

It has been found by the inventor that if each of the detent recesses are formed with substantially the same uniform shape and surface characteristics (such as shown in FIG. 8 as detent recesses (19)), as the sliding carriage member (12) moves along the sliding axis (Y) from the first through to the third sliding positions, a relatively greater amount of force is required to be applied to the lever/handle in order to effect movement of the sliding carriage member (12) from the second sliding position to the third sliding position than when moving the sliding carriage member (12) from the first sliding position to the second sliding position. To compensate for this discrepancy in force required to move the sliding carriage member (12) along the sliding axis due to conventional detent design, a force compensation mechanism has been included in the present embodiments to ensure that a substantially uniform amount of force is required to be applied to the lever/handle to move the sliding carriage member (12) from the second sliding position to the third sliding position compared to when moving the sliding carriage member (12) from the first sliding position to the second sliding position. In this embodiment, the force compensation mechanism may include at least one of the first, second and third detent recesses (18B) being varied in terms of at least one of a shape, size, depth, width, curvature, and surface texture. For instance, if one of the detent recesses (18B) is formed with relatively shallow depth and relatively wide wall angles, it will generally be easier for the detent spring-loaded protrusion (18A) to be disengaged from that detent recess when the lever/handle is rotated than when disengaging the protrusion from other detent recesses having relative deeper and sharper wall angles. Any number of characteristics of a detent recess outlined above may be modified in order to effect force compensation including. Yet further, in alternate embodiments, the force compensation mechanism of the detent mechanism may additionally and/or alternatively include modifying the material shape, surface or inherent properties of the protrusion which engages with the detent recesses such that the protrusion may be configured for greater ease of engagement and release from one detent recess compared to another detent recess by virtue of the customised characteristics of the protrusion and whereby the manner in which the protrusion interacts with each of detent recesses may be controlled to effect force compensation where required. Yet further, in certain embodiments, force compensation may be effected in yet other ways, for instance by further including some magnetic force compensation mechanism or the like to assist in in repelling the protrusion from out of one detent recess compared to that of another to suitably compensate for force the force discrepancy problem. Yet further, in certain embodiments, one or more of the detent recesses may be configured with a resilient material and/or with a secondary spring element to assist in urging the protrusion outwardly of the recess to assist in selectably effecting force compensation.

It will be appreciated from the preceding disclosure that embodiments of the present invention may assist in providing at least one of the following advantages over the cited art:

- the detent assembly may be configured so as to compensate for the increased rotational force required to rotate the control lever as the sliding carriage members moves along the sliding axis as it moves through the various sliding positions.
- the control assembly includes a "Normally-Opened" operational mode position of the switch module of the control assembly that is intermediate between the forward and reverse operational mode positions so as to provide additional safety in the event that the trigger of the power tool is inadvertently actuated.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

What is claimed is:

1. A control assembly for use with an electrical device to control operation of the electrical device in a plurality of operational modes, the control assembly including:
   a rotary member rotatably movable about a rotational axis between at least one of a first rotational position, a second rotational position, and, a third rotational position, said second rotational position being an intermediate position between the first and third rotational positions;
   a sliding carriage member operably-connected with the rotary member, said sliding carriage member being configured for linear sliding movement in to first, second and third sliding positions along a sliding axis in response to the rotary member between arranged in the first, second and third rotational positions, respectively;
   a switch module operably-connected with the sliding carriage member, said switch module being configured for switching operation of the electrical device between a first operational mode, a second operational mode, and a third operational mode in response to the sliding carriage member being arranged in the first, second and third sliding positions, respectively;
   a detent assembly operably-connected with the sliding carriage member to control movement of the sliding carriage member along the sliding axis, said detent assembly including a force compensation mechanism and whereby responsive to operation of the force compensation mechanism of the detent assembly, an amount of force required to effect movement of the rotary member between its first and second rotational positions, and, an amount of force required to effect movement of the rotary member between its second and third rotational positions is able to be maintained substantially uniform.

2. The control assembly as claimed in claim 1, wherein the electrical device includes an electric motor, and wherein, the first operational mode includes operation of the electric motor in a first direction and the second operational mode includes operation of the electric motor in a reverse direction to that of the first direction.

3. The control assembly as claimed in claim 1, wherein the rotational axis is substantially perpendicular to the sliding axis.

4. The control assembly as claimed in claim 1, wherein the detent assembly includes a spring-loaded protrusion configured for releasably engaging with a first, second and third detent recess incrementally as the sliding carriage member slidably moves along the sliding axis in to the first, second and third sliding positions, respectively.

5. The control assembly as claimed in claim 4, wherein the spring-loaded protrusion is disposed on the sliding carriage member.

6. The control assembly as claimed in claim 4, wherein the electrical device includes an electric motor, and wherein, the first operational mode includes operation of the electric motor in a first direction and the second operational mode includes operation of the electric motor in a reverse direction to that of the first direction.

7. The control assembly as claimed in claim 6, wherein the force compensation mechanism includes at least one of the first, second and third detent recesses being configured to vary in terms of at least one of a shape, size, depth, width, curvature, or surface texture whereby the amount of force required to effect movement of the rotary member between its first and second rotational positions, and, the amount of force required to effect movement of the rotary member between its second and third rotational positions is able to be maintained substantially uniform.

8. The control assembly as claimed in claim 7, wherein the rotary member includes a user-operable control lever that is operably-connected with the sliding carriage member whereby rotational movement of the control lever about the rotational axis is translated into linear sliding movement of the sliding carriage.

9. The control assembly as claimed in claim 8, including a handle member operably-connected to the rotary member, said handle member being user-operable so as to effect rotational movement the rotary member about the rotational axis.

10. The control assembly as claimed in claim 9, wherein the rotary member and the handle member are rotatable about the rotational axis.

11. The control assembly as claimed in claim 1, wherein the force compensation mechanism includes at least one of the first, second and third detent recesses being configured to vary in terms of at least one of a shape, size, depth, width, curvature, or surface texture whereby the amount of force required to effect movement of the rotary member between its first and second rotational positions, and, the amount of force required to effect movement of the rotary member between its second and third rotational positions is able to be maintained substantially uniform.

12. The control assembly as claimed in claim 1, wherein the rotary member includes a user-operable control lever that is operably-connected with the sliding carriage member whereby rotational movement of the control lever about the rotational axis is translated into linear sliding movement of the sliding carriage.

13. The control assembly as claimed in claim 1, including a handle member operably-connected to the rotary member, said handle member being user-operable so as to effect rotational movement the rotary member about the rotational axis.

14. The control assembly as claimed in claim 13, wherein the rotary member and the handle member are rotatable about the rotational axis.

15. The control assembly as claimed in claim 1, wherein the first operational mode includes the electric motor being driven in a relatively forward direction, the second operational position includes an open circuit between the electric motor and the power supply, and the third operational position includes the electric motor being driven in a relatively reverse direction.

16. The control assembly as claimed in claim 1, wherein the electrical device includes at least one of an electric power tool or an electric gardening tool.

17. A control assembly for use with an electrical device to control operation of the electrical device in a plurality of operational modes, the control assembly including:
   a rotary member rotatably movable about a rotational axis between at least one of a first rotational position, a second rotational position, and, a third rotational position, said second rotational position being an intermediate position between the first and third rotational positions;
   a sliding carriage member operably-connected with the rotary member, said sliding carriage member being configured for linear sliding movement in to first, second and third sliding positions along a sliding axis in response to the rotary member between arranged in the first, second and third rotational positions, respectively;
   a switch module operably-connected with the sliding carriage member, said switch module being configured for switching operation of the electrical device between a first operational mode, a second operational mode, and a third operational mode in response to the sliding carriage member being arranged in the first, second and third sliding positions, respectively;
   an electric motor, wherein, the first operational mode includes operation of the electric motor in a first direction and the second operational mode includes an open circuit between the electric motor and the power supply, and the third operational mode includes operation of the electric motor in a reverse direction to that of the first direction; and
   a detent assembly operably-connected with the sliding carriage member to control movement of the sliding carriage member along the sliding axis, said detent assembly including a force compensation mechanism and whereby responsive to operation of the force compensation mechanism of the detent assembly, an amount of force required to effect movement of the rotary member between its first and second rotational positions, and, an amount of force required to effect movement of the rotary member between its second and third rotational positions is able to be maintained substantially uniform.

18. The control assembly as claimed in claim 17, wherein the force compensation mechanism includes at least one of the first, second and third detent recesses being configured to vary in terms of at least one of a shape, size, depth, width, curvature, or surface texture whereby the amount of force required to effect movement of the rotary member between its first and second rotational positions, and, the amount of force required to effect movement of the rotary member between its second and third rotational positions is able to be maintained substantially uniform.

19. The control assembly as claimed in claim 17, wherein the rotary member includes a user-operable control lever that is operably-connected with the sliding carriage member whereby rotational movement of the control lever about the rotational axis is translated into linear sliding movement of the sliding carriage.

20. The control assembly as claimed in claim 17, including a handle member operably-connected to the rotary member, said handle member being user-operable so as to effect rotational movement the rotary member about the rotational axis.

* * * * *